(12) United States Patent
Horii et al.

(10) Patent No.: US 7,447,332 B2
(45) Date of Patent: Nov. 4, 2008

(54) IMAGE DISTRIBUTION SYSTEM OF SURVEILLANCE CAMERA WITH PRIVACY PROTECTION

(75) Inventors: Youichi Horii, Mitaka (JP); Junichi Kimura, Koganei (JP); Shigeki Nagaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 849 days.

(21) Appl. No.: 11/037,337

(22) Filed: Jan. 19, 2005

(65) Prior Publication Data
US 2005/0180595 A1    Aug. 18, 2005

(30) Foreign Application Priority Data
Feb. 18, 2004   (JP) .............................. 2004-040802

(51) Int. Cl.
*G06K 9/00* (2006.01)
(52) U.S. Cl. ...................................... 382/103; 348/143
(58) Field of Classification Search ................. 382/103, 382/106, 173, 282, 283, 284; 348/143, 150, 348/154, 155; 380/210
See application file for complete search history.

(56) References Cited

U.S. PATENT DOCUMENTS

| | | | |
|---|---|---|---|
| 6,393,163 B1 * | 5/2002 | Burt et al. .................... | 382/294 |
| 6,570,608 B1 * | 5/2003 | Tserng ........................ | 348/143 |
| 2002/0191846 A1 * | 12/2002 | Crinon et al. ............... | 382/173 |
| 2004/0131254 A1 * | 7/2004 | Liang et al. ................. | 382/181 |
| 2005/0036658 A1 * | 2/2005 | Gibbins et al. .............. | 382/103 |

FOREIGN PATENT DOCUMENTS

| JP | 11-234653 A | 8/1999 |
|---|---|---|
| JP | 2002-84529 A | 3/2002 |

OTHER PUBLICATIONS

Takeshi Naemura, Hiroshi Harashima: "Thermo-key: Human Region Segmentation from Video Using Thermal Information", Symposium on Real World Information Systems, program collection, pp. 29-32 (Sep. 2003).
The Electronic Eye: Surveillance Cameras Are Becoming More Sophisticated And Appearing In Larger Numbers To Cope With Growing Crime Yet Threated "Privacy", pp. 1-8.

* cited by examiner

*Primary Examiner*—Andrew W Johns
(74) *Attorney, Agent, or Firm*—Antonelli, Terry, Stout & Kraus, LLP.

(57) ABSTRACT

It is desirable to distribute a most recently inputted image of merchandise in a shop without showing customers visiting a shop, or to distribute an image showing how crowded a shop is without infringing on the privacy of visitors to the ship. This is achieved by separating areas showing moving objects and areas showing no moving objects of an image and synthesizing an image showing stationary objects only by replacing the moving object area with the corresponding area of an earlier inputted image showing stationary objects only, or by processing the moving object area of an image, for example, by applying a mosaic to such an area, and synthesizing the synthesized image showing stationary objects only. The image in which the moving object area has been processed enables the distribution of an image showing how crowded a shop is without infringing on the privacy of visitors.

14 Claims, 14 Drawing Sheets

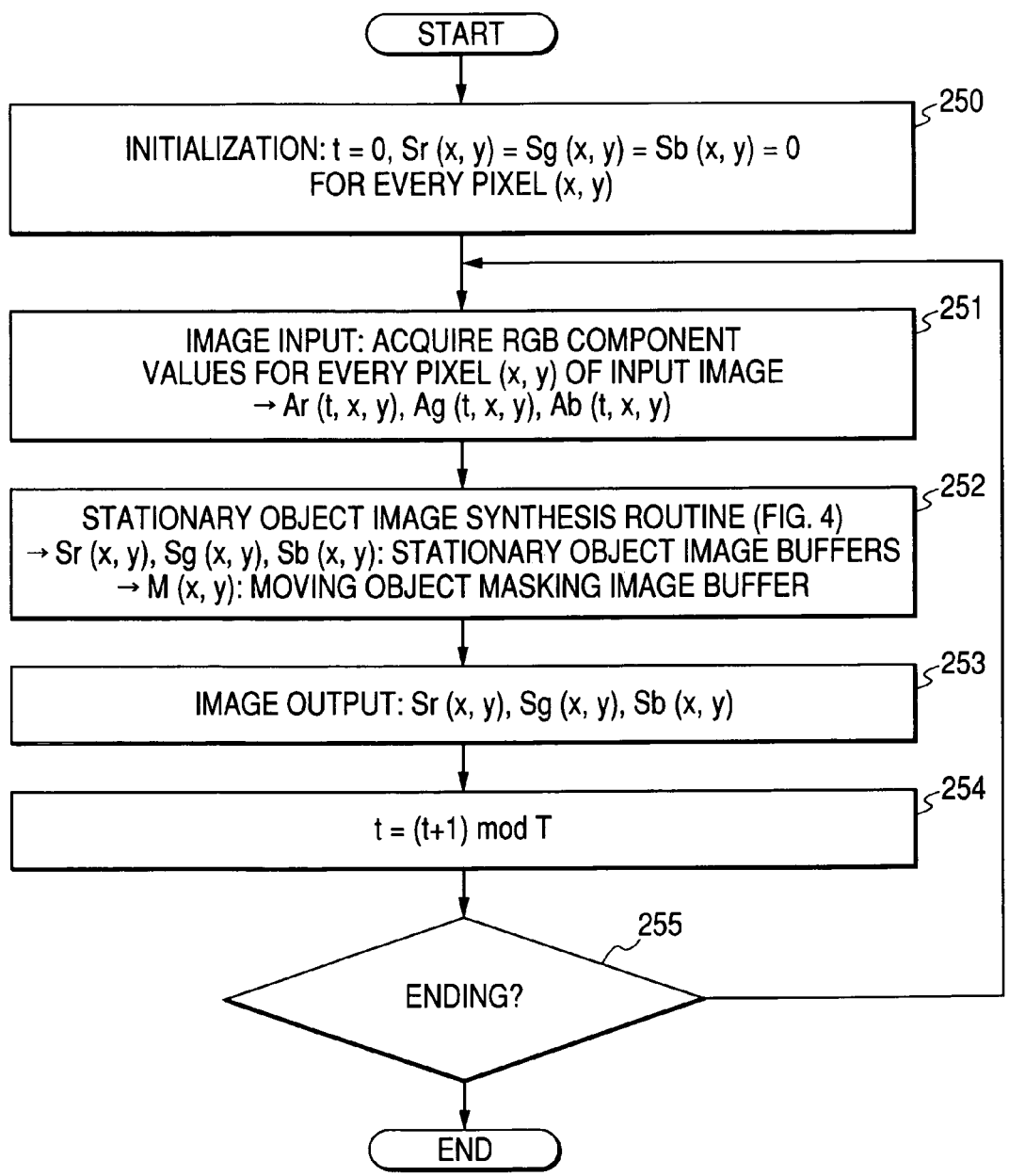

FIG. 4A

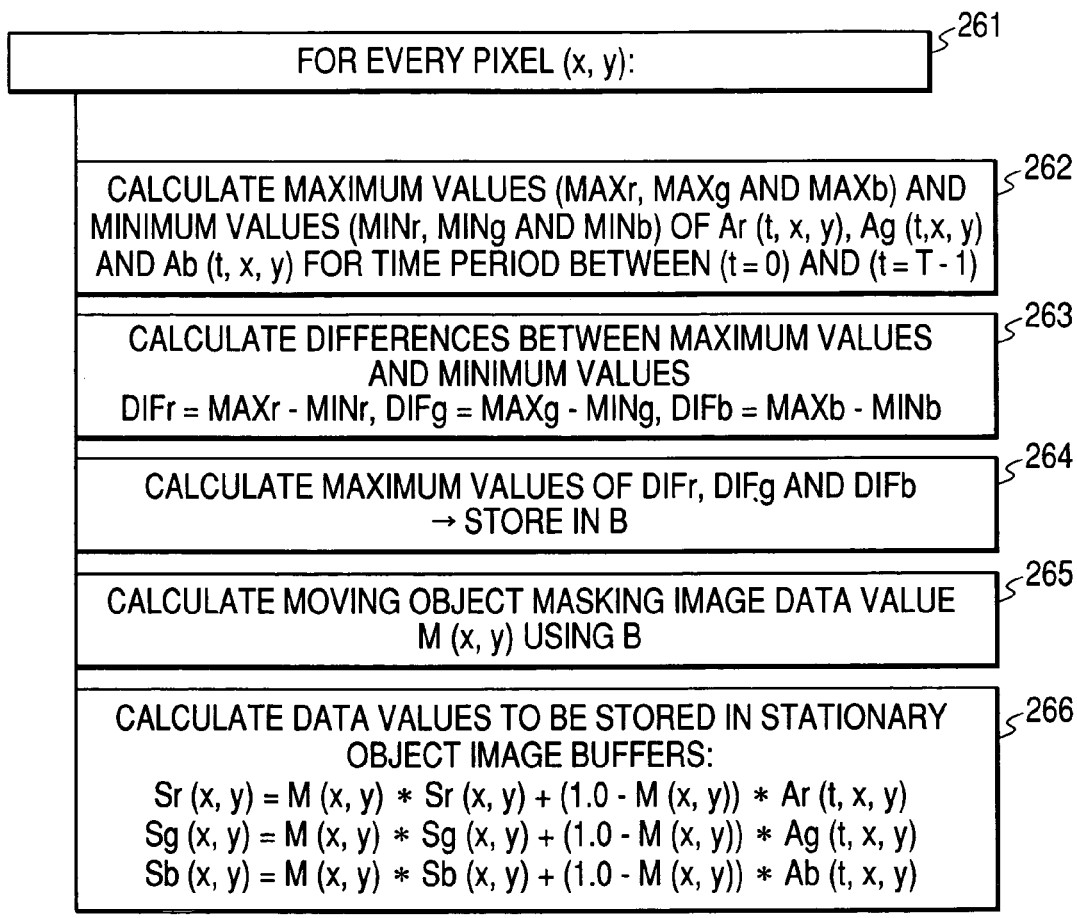

261 — FOR EVERY PIXEL (x, y):

262 — CALCULATE MAXIMUM VALUES (MAXr, MAXg AND MAXb) AND MINIMUM VALUES (MINr, MINg AND MINb) OF Ar (t, x, y), Ag (t, x, y) AND Ab (t, x, y) FOR TIME PERIOD BETWEEN (t = 0) AND (t = T - 1)

263 — CALCULATE DIFFERENCES BETWEEN MAXIMUM VALUES AND MINIMUM VALUES
DIFr = MAXr - MINr, DIFg = MAXg - MINg, DIFb = MAXb - MINb

264 — CALCULATE MAXIMUM VALUES OF DIFr, DIFg AND DIFb → STORE IN B

265 — CALCULATE MOVING OBJECT MASKING IMAGE DATA VALUE M (x, y) USING B

266 — CALCULATE DATA VALUES TO BE STORED IN STATIONARY OBJECT IMAGE BUFFERS:
Sr (x, y) = M (x, y) * Sr (x, y) + (1.0 - M (x, y)) * Ar (t, x, y)
Sg (x, y) = M (x, y) * Sg (x, y) + (1.0 - M (x, y)) * Ag (t, x, y)
Sb (x, y) = M (x, y) * Sb (x, y) + (1.0 - M (x, y)) * Ab (t, x, y)

FIG. 4B

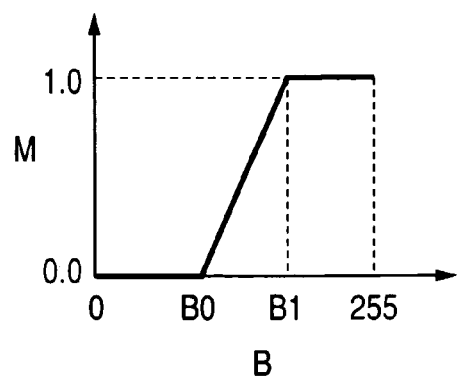

FIG. 5A
TIME-SERIES VARIATION IN INPUT IMAGE Ar (t, x, y)

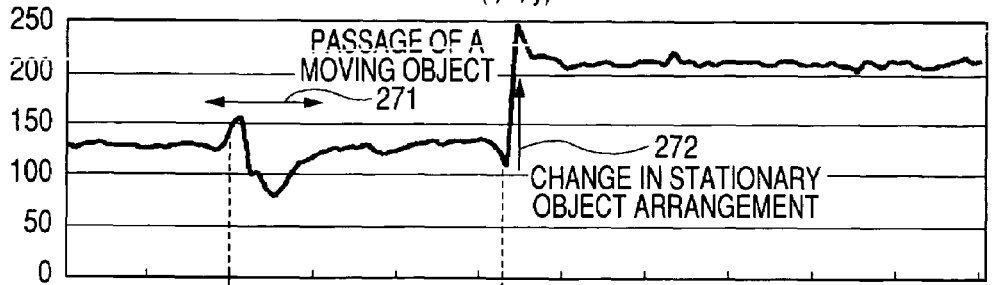

PASSAGE OF A MOVING OBJECT — 271
272 — CHANGE IN STATIONARY OBJECT ARRANGEMENT

FIG. 5B
TIME-SERIES VARIATION IN MOVING OBJECT MASKING IMAGE DATA VALUE M (x, y)

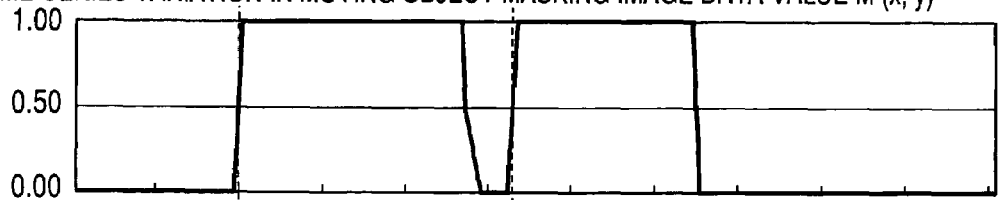

FIG. 5C
TIME-SERIES VARIATION IN STATIONARY OBJECT IMAGE Sr (x, y)

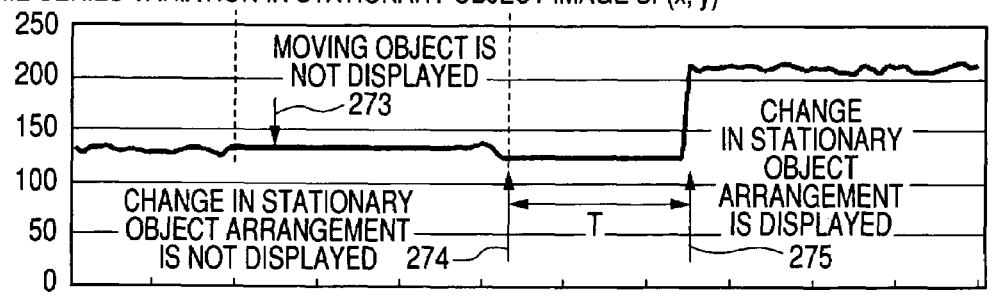

MOVING OBJECT IS NOT DISPLAYED — 273
CHANGE IN STATIONARY OBJECT ARRANGEMENT IS NOT DISPLAYED 274
CHANGE IN STATIONARY OBJECT ARRANGEMENT IS DISPLAYED — 275

FIG. 5D
TIME-SERIES VARIATION IN INPUT IMAGE Ar (t, x, y)

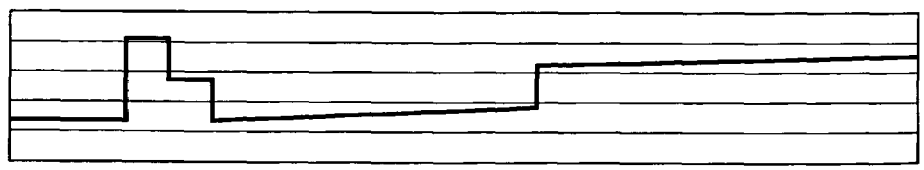

FIG. 5E
TIME-SERIES VARIATION IN STATIONARY OBJECT IMAGE Sr (x, y)

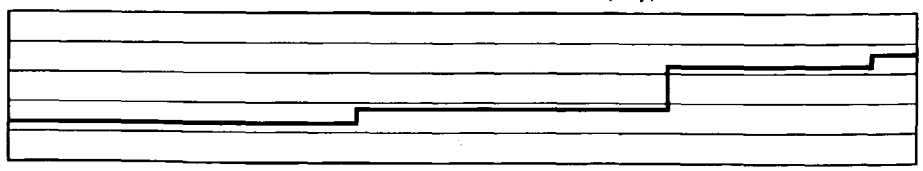

MOSAICKING

SILHOUETTING

SCRAMBLING KEYS AND DESCRAMBLING KEYS HELD
BY CONTROL CENTER AND SURVEILLANCE CENTER

SCRAMBLING KEY HELD BY CONTROL CENTER AND
DESCRAMBLING KEY HELD BY SURVEILLANCE CENTER

SCRAMBLING KEY AND DESCRAMBLING KEY
HELD BY CONTROL CENTER

SCRAMBLING KEY AND DESCRAMBLING KEY
HELD BY SURVEILLANCE CENTER

IMAGE DISTRIBUTION SYSTEM OF SURVEILLANCE CAMERA WITH PRIVACY PROTECTION

CLAIM OF PRIORITY

The present application claims priority from Japanese application JP2004-040802, filed on Feb. 18, 2004, the content of which is hereby incorporated by reference into this application.

FIELD OF THE INVENTION

This invention relates to a system for distributing an image that has been shot with a surveillance camera via a network.

BACKGROUND OF THE INVENTION

In recent years, as described in *Evolution and Proliferation of Surveillance Cameras and 'Inconvenience'—Introduction of Electronic Eyes on Rise to Cope with High Incidence of Crimes* (Non-patent document 1), there has been a growing tendency toward installing surveillance cameras in stores and over streets for security purposes. With an increasing number of such networks being put in use, so-called web cameras have been installed here and there, with the result that it has been increasingly easy to monitor an image of an area of business facility remotely. As described in JP-A No. 84529/2002 (patent document 1) and JP-A No. 234653/1999 (patent document 2), a system for distributing an image that has been inputted with the use of a surveillance camera via a network has been introduced. If an image inputted with the use of a surveillance camera installed in a shop can be distributed to general households, the image can enable consumers to check the availability of merchandise of their interest, possibly causing the consumers to visit the shop and do some shopping. However, there may be cases in which distributing an image showing customers visiting a shop via a network that is accessible by the general public is not desirable in the light of personal rights and privacy of the persons being viewed. In such an application of a surveillance camera, there is also another problem in that an image inputted in a shop may not necessarily show all available merchandise, since customers visiting the shop may block the view of the surveillance camera.

[Patent document 1] JP-A No. 84529/2002
[Patent document 2] JP-A No. 234653/1999
[Non-patent document 1] S. Segawa, "Evolution and Proliferation of Surveillance Cameras and 'Inconvenience' m Introduction of Electronic Eyes on Rise to Cope With High Incidence of Crimes", [online], (Aera magazine: Aug. 4, 2003 issue), the home page of the Asahi Shimbun, [searched on Feb. 9, 2004], www.asahi.com/housing/zasshi/TKy200308200179.html [Non-patent document 2] Takeshi Naemura, Hiroshi Harashima: "Thermo-key: Human Region Segmentation from Video Using Thermal Information", Symposium on Real World Information Systems, program collection, pp. 29-32 (2003.09).

SUMMARY OF THE INVENTION

An object of the present invention is to provide a method of enabling (1) distribution of a most recently inputted image of merchandise available, for example, at a shop without showing visitors to the shop.

On the other hand, for example, when the extent to which a restaurant is crowded has to be communicated, it is necessary, contrary to the above-stated object, to distribute an image showing customers in the restaurant. Another object of the present invention is to provide a method of enabling (2) distribution of an image showing how much, for example, a restaurant is crowded without infringing on the personal rights or privacy of customers at the restaurant.

It is furthermore necessary that, in accordance with original objective of installing a surveillance camera, i.e., to prepare for and record an emergency situation, an image inputted with a surveillance camera should be made viewable and recordable as it is depending on the case. Still another object of the present invention is to provide a method of enabling (3) distribution of an image which makes it possible to control the viewable area of the image and the user qualification.

The following features are in line with the purpose of attaining the above-staged objects:

(1) Providing a means for separating an area showing moving objects, such as persons, and other areas showing no moving objects of an image, and a means for synthesizing an image showing stationary objects only by replacing the moving object area of an image with the corresponding area of an earlier inputted image showing stationary objects only, thereby making it possible to distribute a most recently inputted image of merchandise available at a shop without showing visitors to the shop.

(2) Providing a means for separating an area showing moving objects, such as persons, and other areas showing no moving objects of an image, a means for synthesizing an image showing stationary objects only by replacing the moving object area of an image with the corresponding area of an earlier inputted image showing stationary objects only, a means for processing the moving object area of an image, for example, by applying a mosaic to such an area, and a means for synthesizing the synthesized image showing stationary objects only and the image in which the moving object area has been processed, making it possible to distribute an image showing how much, for example, a shop is crowded without infringing on the personal rights and privacy of visitors to the shop.

(3) Providing a means for separating an area showing moving objects, such as persons, and other areas showing no moving objects of an image, a means for synthesizing an image showing stationary objects only by replacing the moving object area of an image with the corresponding area of an earlier inputted image showing stationary objects only, a means for processing the moving object area of an image, for example, by applying a mosaic to such an area using an encryption key, a means for synthesizing the synthesized image showing stationary objects only and the image in which the moving object area has been processed, and a means for allowing only users having a decryption key to view the unprocessed image showing both stationary objects and moving objects, making it possible to distribute an image showing how much, for example, a shop is crowded without infringing on the personal rights and privacy of visitors to the shop.

The present invention makes the following possible:

(1) Using a surveillance camera installed, for example, in a shop, to distribute an image inputted with the surveillance camera an enable general consumers at home to check the availability of merchandise of their interest at the shop, possibly causing them to visit the shop and do some shopping.

(2) Using a surveillance camera installed, for example, in a restaurant, to distribute an image inputted with the surveillance camera, can enable general consumers at home to determine how much the restaurant is crowded, possibly causing them to visit the restaurant.

(3) In accordance with an original aim of installing a surveillance camera, i.e., to prepare for and record an emergency situation, the viewable area of an image inputted with the surveillance camera and the user qualification can be controlled, and, depending on the case, the image be viewed and recorded as it is.

BRIEF DESCRIPTION OF THE DRAWINGS

FIG. 3 is a flowchart showing a flow of processing for generating an image in which a moving object image has been erased;

FIG. 4A is a flowchart showing a flow of processing performed by a stationary object image synthesis routine according to the first embodiment of the present invention; and FIG. 4B is a graph showing a characteristic relating to brightness variation values;

FIGS. 5A to 5E are diagrams showing an example of time-series variation in RGB component values in the first embodiment of the present invention;

DETAILED DESCRIPTION OF THE PREFERRED EMBODIMENTS

First Embodiment

An embodiment of the present invention will be described with reference to the drawings. The first embodiment constitutes a method which may be used for separating an area showing moving objects, such as persons, and other areas showing no moving objects of an image, synthesizing an image showing stationary objects only by replacing the moving object area of an image with the corresponding area of an earlier inputted image showing stationary objects only, and distributing a most recently inputted image of merchandise available at a shop without showing the visitors in the shop.

Figure 1:
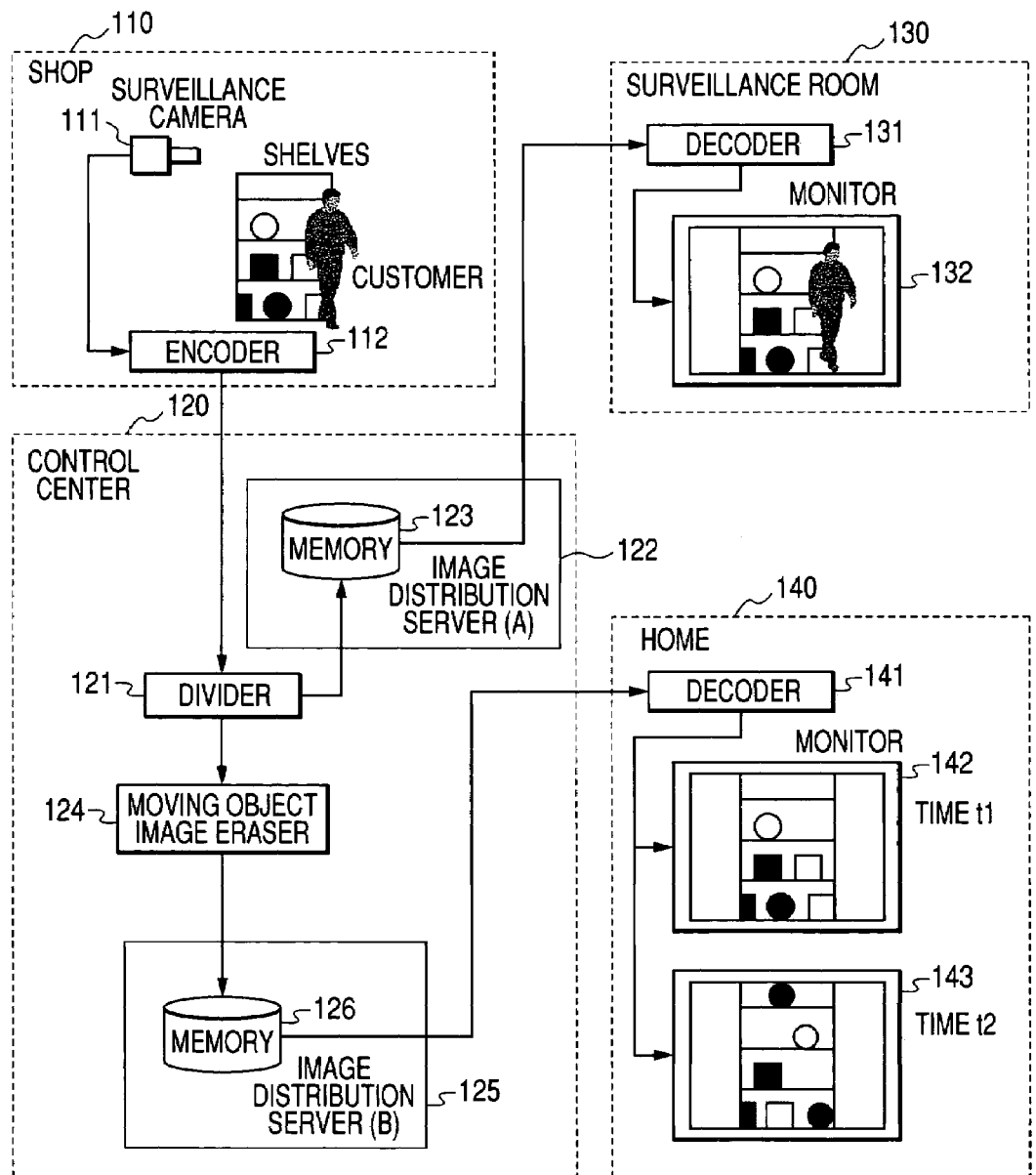
FIG. 1 is a block diagram showing the configuration of a first embodiment of the present invention.

FIG. 1 is a block diagram showing the configuration of this first embodiment of the present invention. Reference numeral 110 denotes a shop where a surveillance camera is installed, 120 denotes a control center for distributing an image inputted with use of the surveillance camera to other places, such as a surveillance room and general homes, 130 denotes a surveillance room where the image inputted with the surveillance camera is monitored for security purposes, and 140 denotes a home which serves as an example of the destination of image distribution.

In the shop 110, the surveillance camera 111 inputs an image of the interior of the shop showing shelves and customers, the image is encoded is into digital data by an encoder 112, and the digital data is transmitted to the control center 120. The encoding performed by the encoder 112 includes storing a moving image, in a format such as motion JPEG or MPEG, as digital data and distributing the stored digital data.

In the control center 120, the data on the image inputted from the surveillance camera as received from the shop is divided at a divider 121 for transmission along two routes. The image data for transmission along one of the two routes is inputted to an image distribution server (A) 122 and stored in a memory 123. The image data for transmission along the other of the two routes is inputted to a moving object image eraser 124 to generate an image from which moving object images have been erased. The data on the image showing no moving objects thus generated is inputted to an image distribution server (B) 125 and stored in a memory 126. The generation of an image from which moving object images have been erased will be described in detail later with reference to FIGS. 2 to 5E.

In the surveillance room 130, the image data stored in the image distribution server (A) 122 in the control center 120 is decoded at a decoder 131 and displayed on a monitor 132. Thus, in the surveillance room 130, it is possible to view the image of the shop as it is, including the customers present therein.

When the image data stored in the image distribution server (B) 125 is received at a home 140, it is decoded at a decoder 141 and displayed on a monitor 142. The image displayed on the monitor has been processed to erase moving objects so that it shows stationary objects only, such as merchandise displayed in the shop. Furthermore, as shown in the illustration is with reference numeral 143, the image displayed on the monitor is periodically updated to reflect changes which occur in the shop's interior, for example, by the moving or removing of merchandise articles, or by the addition of new merchandise articles. In this way, users at home can periodically check the condition of stationary objects displayed in the shop, i.e., to determine the availability of merchandise of their interest, with a certain time lag, whereas the personal rights and privacy of customers visiting the shop are not infringed on. The home mentioned above refers to a networked environment. It may be other than a home; for example, it may be a networked office or coffee shop.

Figure 2:
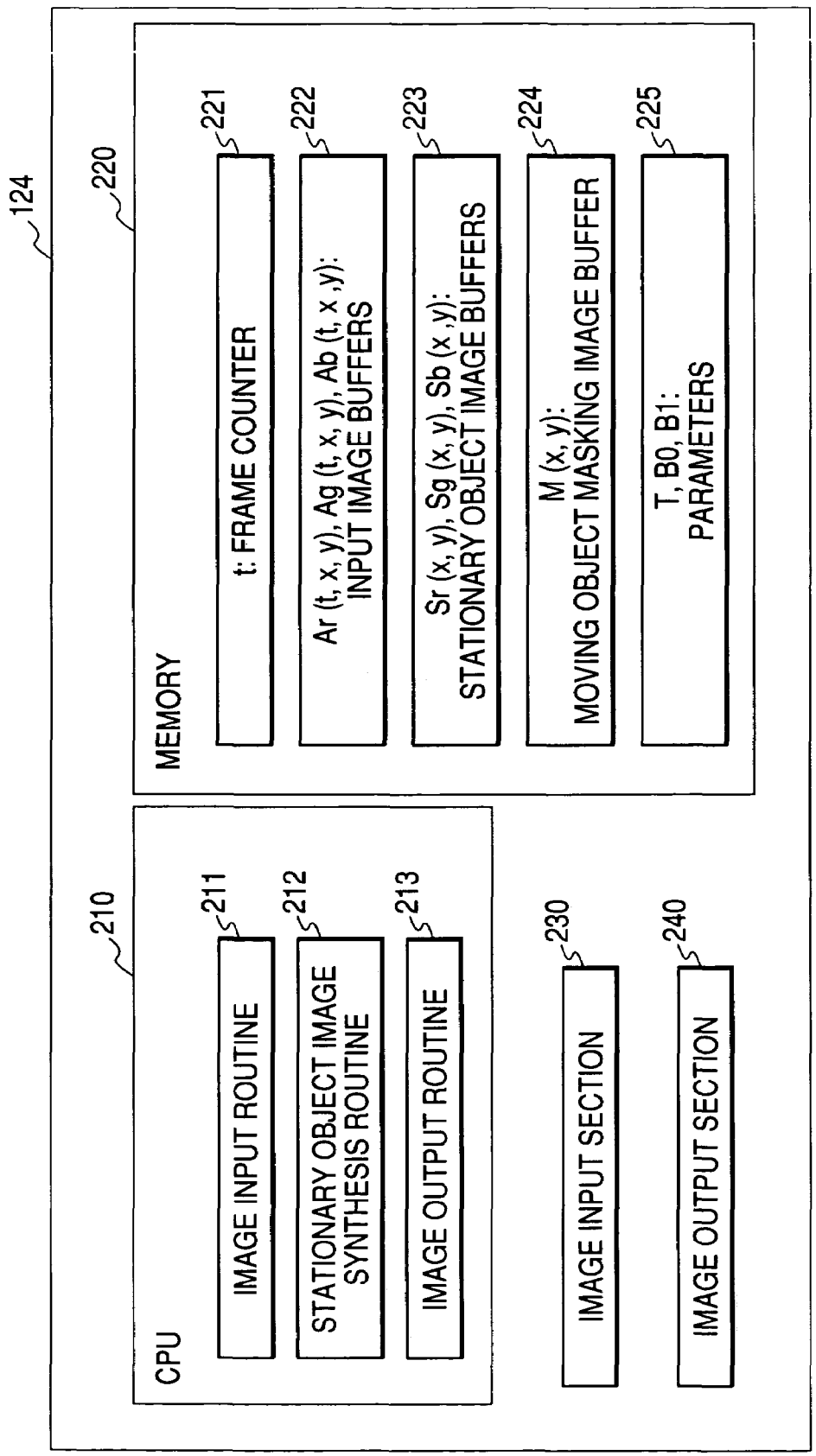
FIG. 2 is a block diagram showing a moving object image eraser according to the first embodiment of the present invention.

Next, the moving object image eraser 124 shown in FIG. 1 will be described with reference to FIG. 2. The moving object image eraser 124 includes a CPU 210, a memory 220, an image input section 230, and an image output section 240. The flow of processing performed in the moving object image eraser 124 will be described in detail later with reference to FIG. 3.

The CPU 210 holds programs that have been loaded therein, such as an image input routine 211, a stationary object image synthesis routine 212, and an image output routine 213. The image input routine 211 inputs image data transmitted from the divider shown in FIG. 1 and stores the image data in input image buffers (Ar, Ag, and Ab) 222. The stationary object image synthesis routine 212 generates data to be stored in stationary object image buffers (Sr, Sg and Sb) 223 and a moving object masking image buffer (N) 224 by performing a calculation using the image data stored in the input image buffers (Ar, Ag, and Ab) 222. The calculation will be described in detail later with reference to FIGS. 4A and 4B.

4. The image output routine 213 transmits the image data stored in the stationary object image buffers 223 to the image distribution server (B) shown in FIG. 1 via the image output section 240.

In the memory 220, a frame counter (t) 221 and parameters (T, B0, and B1) 225 are stored, in addition to provision of the input image buffers (Ar, Ag, and Ab) 222, stationary object image buffers 223 and moving object masking image buffer (N) 224. The input image buffers (Ar, Ag, and Ab) 222 each have a capacity equal to the product of the horizontal resolution of the input image, the vertical resolution of the input image, and the frame buffer size (T). They hold integer values representing the red, green, and blue components of each input image pixel, respectively, each integer value ranging from 0 to 255. The stationary object image buffers (Sr, Sg and Sb) 223 each have a capacity equal to the product of the horizontal and the vertical resolutions of the input image. They hold integer values representing the red, green, and blue components of each input image pixel, respectively, each integer value ranging from 0 to 255. The moving object masking image buffer (N) 224 has a capacity equal to the product of the horizontal and the vertical resolutions of the input image and holds floating point values, each ranging from 0.0 to 1.0.

Next, the flow of processing performed by the moving object image eraser will be described with reference to FIG. 3. In step 250, 0 is assigned to the frame counter (t); and, in the stationary object image buffers (Sr, Sg and Sb) 223, also 0 is assigned to Sr (x, y), Sg (x, y), and Sb (x, y) for every pixel (x, y), thereby initializing the frame counter (t) and the stationary object image buffers (Sr, Sg and Sb). In step 251, the red, green, and blue components of every pixel of the input image are acquired and stored at Ar (t, x, y), Ag (t, x, is y), and Ab (t, x, y). In step 252, using the data stored in the input image buffers (Ar, Ag, and Ab) and the stationary object image buffers (Sr, Sg and Sb), the data stored in the stationary object image buffers (Sr, Sg and Sb) is updated and the data to be stored in the moving object masking image buffer (M) is generated by calculation. This process will be described in detail later with reference to FIG. 4A. In step 253, the image data stored in the stationary object image buffers (Sr, Sg and Sb) is outputted. In step 254, the remainder left when (t+1) is divided by T is assigned to the frame counter (t). If not terminated in step 255, the processing returns to step 251; otherwise, the processing ends.

Next, the stationary object image synthesis routine will be described with reference to FIG. 4A and FIG. 4B. In step 261 shown in FIG. 4A, steps 262 through 266 are performed for every pixel (x, y). In step 262, the respective maximum values of Ar (t, x, y), Ag (t, x, y), and Ab (t, x, y), during the period between the time when the time count t is 0 and the time when the time count t is (T−1), are calculated and stored at MAXr, MAXg, and MAXb, respectively. Similarly, the respective minimum values of Ar (t, x, y), Ag (t, x, y), and Ab (t, x, y) are also calculated and stored at MINr, MINg, and MINb, respectively. In step 263, the differences between the maximum values MAXr, MAXg, and MAXb of the red, green, and blue components and the corresponding minimum values MINr, MINg, and MINb are calculated and stored at DIFr, DIFg, and DIFb, respectively. In step 264, the maximum values of DIFr, DIFg, and DIFb are calculated and stored at B as brightness variation data. In step 265, using a function defined on the basis of B0 and B1, as shown in FIG. 4B, B is mapped from 0.0 to 1.0 and the result of mapping is stored at M (x, y). B0 and B1 represent values used to adjust the moving object masking image brightness. Using the two threshold values makes it possible to smooth the border between the moving object area and the other areas of an image. Reducing the difference between the values of B0 and B1 enhances the contrast of the moving object masking image (based on M). Also, when the average value of B0 and B1 is larger, the moving object masking image (based on M) is brighter. In step 266, the data to be stored in the stationary object image buffers (Sr, Sg and Sb) is generated by calculating the weighted averages of the data currently stored in the input image buffers (Ar, Ag, and Ab) and the data last calculated and stored in the stationary object image buffers (Sr, Sg and Sb) using the moving object masking image data (M).

The stationary object image synthesis routine 212 will be described with reference to FIGS. 5A to 5E. FIG. 5A shows an example of time-series variation (change with time) in the value of input image data Ar (t, x, y) of a pixel. In the chart of FIG. 5A, the portion denoted by reference numeral 271, showing a wide variation in the data value in a short period of time, represents the passing of a moving object, for example, a customer, across the pixel (x, y). In the portion denoted by reference numeral 272, the data value is stable following an abrupt change. Such time-series data indicates that a stationary object, for example, a merchandise article displayed in a shop, has been moved and then left in the same position. In both of these cases, as described with reference to FIG. 4A, the difference DIFr between the maximum and the minimum values of the pixel during the time period corresponding to the past 'T' frames becomes large; arid, as shown in FIG. 5B, the value of the moving object masking image data N (x, y) also becomes large. Thus, when a moving object passes across the pixel (x, y), the values of B and M become large, and the data calculated last and stored in the stationary object image buffers (Sr, Sg and Sb) are weighted more than the data stored in the input image buffers (Ar, Ag, and Ab). Conversely, when no moving object passes, the input image is given priority.

In this way, when a moving object passes across the pixel (x, y), as shown in FIG. 5C, priority is given to the immediately preceding data stored in the stationary object image buffers (Sr, Sg, and Sb) so that the moving object is not displayed. When a stationary object is moved, as shown in the portion denoted by reference numeral 274, the move is not immediately reflected in the image, but an image showing the result of the move appears after a certain period of time (i.e., 'T' frames later), as shown in the portion denoted by reference numeral 275.

It follows that even a moving object, such as a customer in a shop, will be displayed in an image if the customer stays still during a period of 'T' frames. In reality, however, such a situation seldom occurs in a shop so that the above-described method can be put into practical use by adjusting the value of T as required. When the value of T is increased, a moving object to be displayed on the monitor in the home 140 without being detected as a moving object requires the brightness variation of the relevant pixels to stay below the threshold value for a longer period of time. Therefore, when the value of T is increased, a moving object can be detected more easily (that is, it is displayed less easily). The maximum brightness variation to be ignored can be adjusted with the settings of B0 and B1. Setting B0 and B1 high, for example, causes a small brightness variation to be ignored.

As shown in FIG. 5D and FIG. 5E, the present method can cope with a slow brightness variation caused, for example, as the sunshine in a scene changes gradually. While the input image data Ar, Ag, and Ab will slowly change, the data stored in the stationary object image buffers (Sr, Sg and Sb) will be updated at unspecified times. Then, based on the comparison between the updated data Sr, Sg, and Sb and the latest input image data Ar, Ag, and Ab, the moving object area and the other area on the input image are separated. Thus, the present method can be used even in a case in which the environment changes slowly.

Second Embodiment

In the following, a second embodiment of the present invention will be described with reference to the drawings. The second embodiment constitutes a method which may be used for separating an area showing moving objects, such as persons, and other areas showing no moving objects of an image, replacing the moving object area of the image with the corresponding area of an earlier inputted image showing stationary objects only, thereby synthesizing an image showing stationary objects only, processing the moving object area of the image, for example, applying a mosaic to such an area, synthesizing the synthesized image showing stationary objects only and the image in which the moving object area has been processed, and distributing the synthesized image showing how much, for example, a shop is crowded without infringing on the personal rights and privacy of visitors to the shop.

Figure 6:
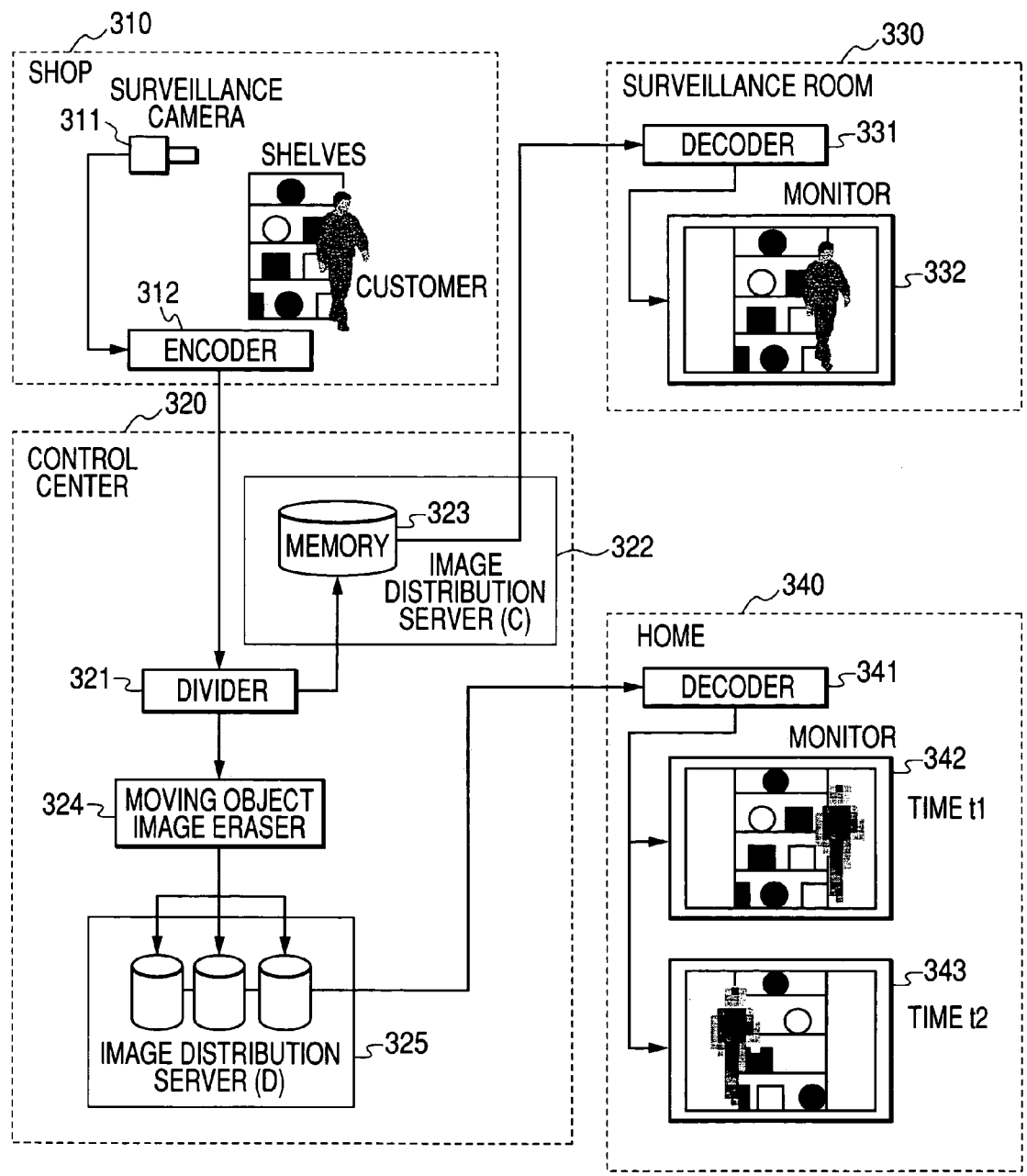
FIG. 6 is a block diagram showing the configuration of a second embodiment of the present invention.

FIG. 6 is a block diagram showing the configuration of the second embodiment of the present invention. Reference numeral 310 denotes a shop where a surveillance camera is installed, 320 denotes a control center for distributing an image inputted with the surveillance camera to a surveillance room and general homes, 330 denotes a surveillance room where the image inputted with the surveillance camera is monitored for security purposes, and 340 denotes a home.

In the shop 310, the surveillance camera 311 inputs an image of the interior of the shop showing shelves and customers, the image is encoded into digital data at an encoder 312, and the digital data is transmitted to the control center 320. In the control center 320, the image data received from the shop is divided by a divider 321 for transmission along two routes. The image data for transmission along one of the two routes is inputted to an image distribution server (C) 322 and stored in a memory 323. The image data for transmission along the other of the two routes is inputted to a moving object image eraser 324. Eventually, an image, on which a moving object area showing moving objects, for example, customers visiting the shop, has been processed, for example, silhouetted or mosiaced, to make the moving objects unidentifiable, is inputted to an image distribution server (D) 325 and stored in a memory 326. In the surveillance room 330, the image data stored in the image distribution server (C) 322 in the control center 320 is decoded at a decoder 331 and displayed on a monitor 332.

Thus, in the surveillance room, it is possible to view the image of the shop as it is. In the home 340, at least one of the images stored in the image distribution server (D) 325 is selected and the selected image is decoded at a decoder 341 and displayed on a monitor 342. On the image shown on the monitor 342, the area showing moving objects, such as customers visiting the shop, has been processed, for example, mosaiced or silhouetted. As shown in the illustration with reference numeral 343, the image displayed on the monitor 342 is periodically updated to reflect changes caused to the shop's interior, for example, by moving or removing merchandise articles or by addition of new merchandise articles. In this way, users at home can periodically check the availability of merchandise of their interest without causing the personal rights and privacy of customers visiting the shop to be infringed on.

Figure 7:
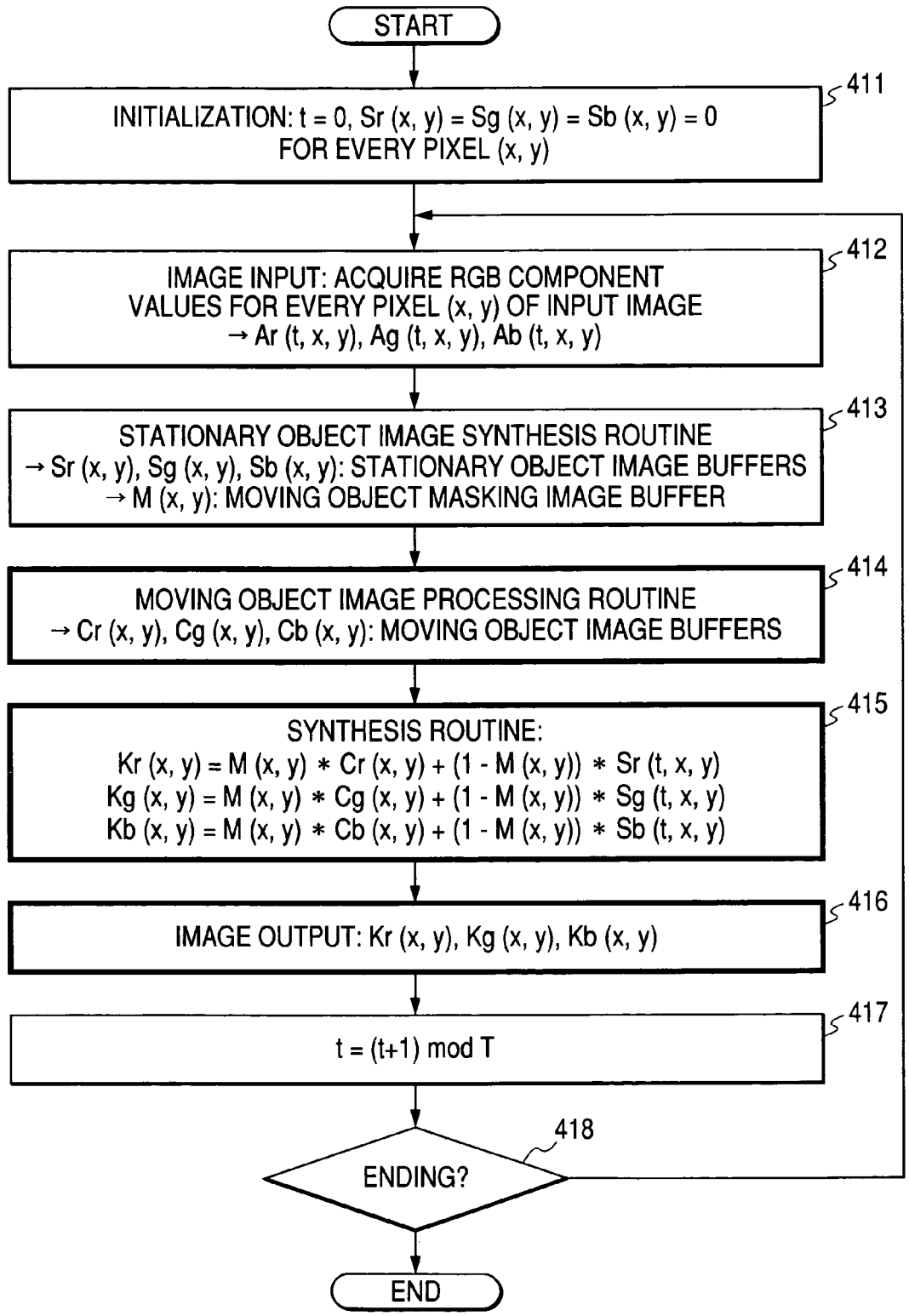
FIG. 7 is a flowchart showing a flow of processing according to the second embodiment of the present invention.

FIG. 7 shows the flow of processing according to the present embodiment. In the present embodiment, steps 414, 415, and 416 are performed instead of the step 253, which was described with reference to FIG. 3 in conjunction with the first embodiment. Steps 411, 412, 413, 417, and 418 (extracting a portion representing the passage of a moving object) are equivalent to the corresponding portions of processing shown in FIG. 3, so that they will not be described here.

In step 414, the moving object area of the input image is processed, for example, mosiaced or silhouetted, and the processed image is stored in the moving object image buffers Cr (x, y), Cg (x, y), and Cb (x, y). The processing performed in this step will be described in detail later with reference to FIGS. 8A and 8B. The moving object image buffers (Cr, Cg, and Cb) each have a capacity equal to the product of the horizontal and the vertical resolutions of the input image. They hold integer values representing the red, green, and blue components of each input image pixel, respectively, each integer value ranging from 0 to 255. In step 415, the weighted averages of the data stored in the moving object image buffers (Cr, Cg, and Cb) and the stationary object image buffers (Sr, Sg, and Sb) are calculated using the data stored in the moving object masking image buffer N. The data obtained by the calculation is stored in the synthesized image buffers (Kr, Kg, and Kb). The synthesized image buffers (Kr, Kg, and Kb) each have a capacity equal to the product of the horizontal and the vertical resolutions of the input image. They hold integer values representing the red, green, and blue components of each input image pixel, respectively, each integer value ranging from 0 to 255. In step 416, the image data stored in the synthesized image buffers (Kr, Kg, and Kb) is outputted.

Figure 8A:
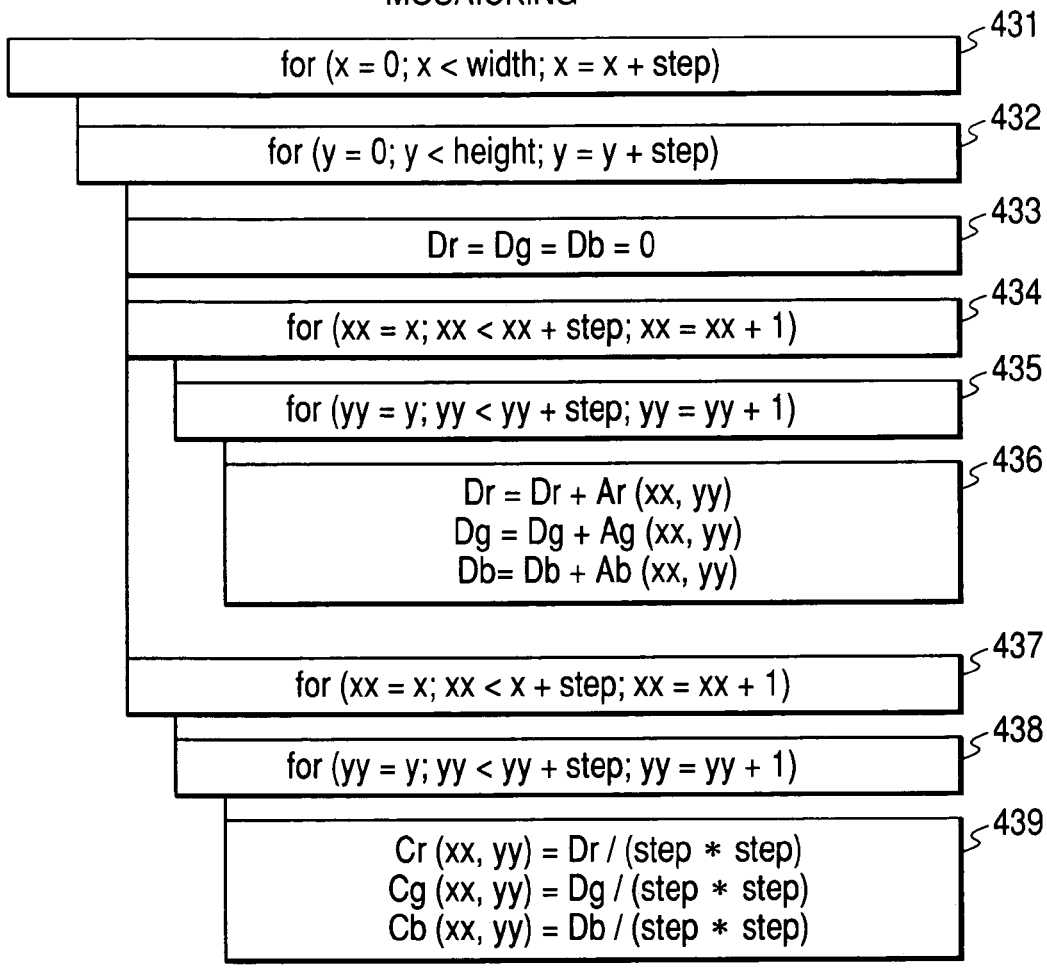
FIGS. 8A and 8B are flowcharts showing a flow of processing performed by a moving object image processing routine according to the second embodiment of the present invention.
Figure 8B:
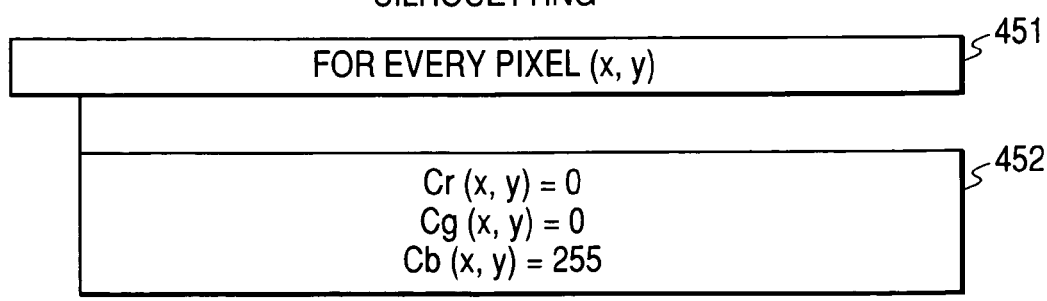

An example of the moving object image processing routine is shown in FIGS. 8A and 8B. FIG. 8A shows processing for mosaicing. FIG. 8B shows processing for silhouetting.

First, the processing for mosaicing will be described with reference to FIG. 8A. In steps 431 and 432, an image is divided into blocks, with each block composed of 'step' horizontal pixels by 'step' vertical pixels. For each of the blocks, the processing of steps 433 through 439 is performed. In step 433, 0 is assigned to Dr, Dg, and Db. In steps 434 and 435, the processing of step 436 is performed for each pixel of each block. In step 436, the data stored in the input image buffers (Ar, Ag, and Ag) is added to the data stored at Dr, Dg, and Db, respectively. In steps 437 and 438, the processing of step 439 is performed for each pixel of each block. In step 439, the quotients obtained by dividing the data stored at Dr, Dg, and Db by the square of the value of the 'step' are assigned to the moving object image buffers (Cr, Cg, and Cb), respectively. Using the processing as described above, it is possible to generate a mosaic image made up of blocks, with each block being composed of 'step' horizontal pixels by 'step' vertical pixels and representing intrablock average values of red, green, and blue components, and to store the mosaic image data in the moving object image buffers (Cr, Cg, and Cb).

Next, the processing for silhouetting will be described with reference to FIG. 8B. In step 451, the processing of step 452 is performed for every pixel. In step 452, 0 is assigned to Cr and Cg, and 255 is assigned to Cb. Using the above-described processing, it is possible to synthesize an image in which moving objects are silhouetted in blue. The color of the silhouetting can be changed as desired by adjusting the values assigned to Cr, Cg, and Cb.

Third Embodiment

In the following, a third embodiment of the present invention will be described with reference to the drawings. The third embodiment constitutes a method which may be used for separating an area showing moving objects, such as persons, and other areas showing no moving objects of an image, replacing the moving object area of the image with the corresponding area of an earlier inputted image showing stationary objects only, thereby synthesizing an image showing stationary objects only, processing, by the use of a scrambling key, the moving object area of the image, for example, by applying a mosaic to the moving object area of the image, synthesizing the synthesized image showing stationary objects only and the image in which the moving object area has been processed, and distributing the image thus synthesized while allowing only the users having a descrambling key to descramble the processed moving object area of the image to view the image in an unprocessed state.

Figure 9:
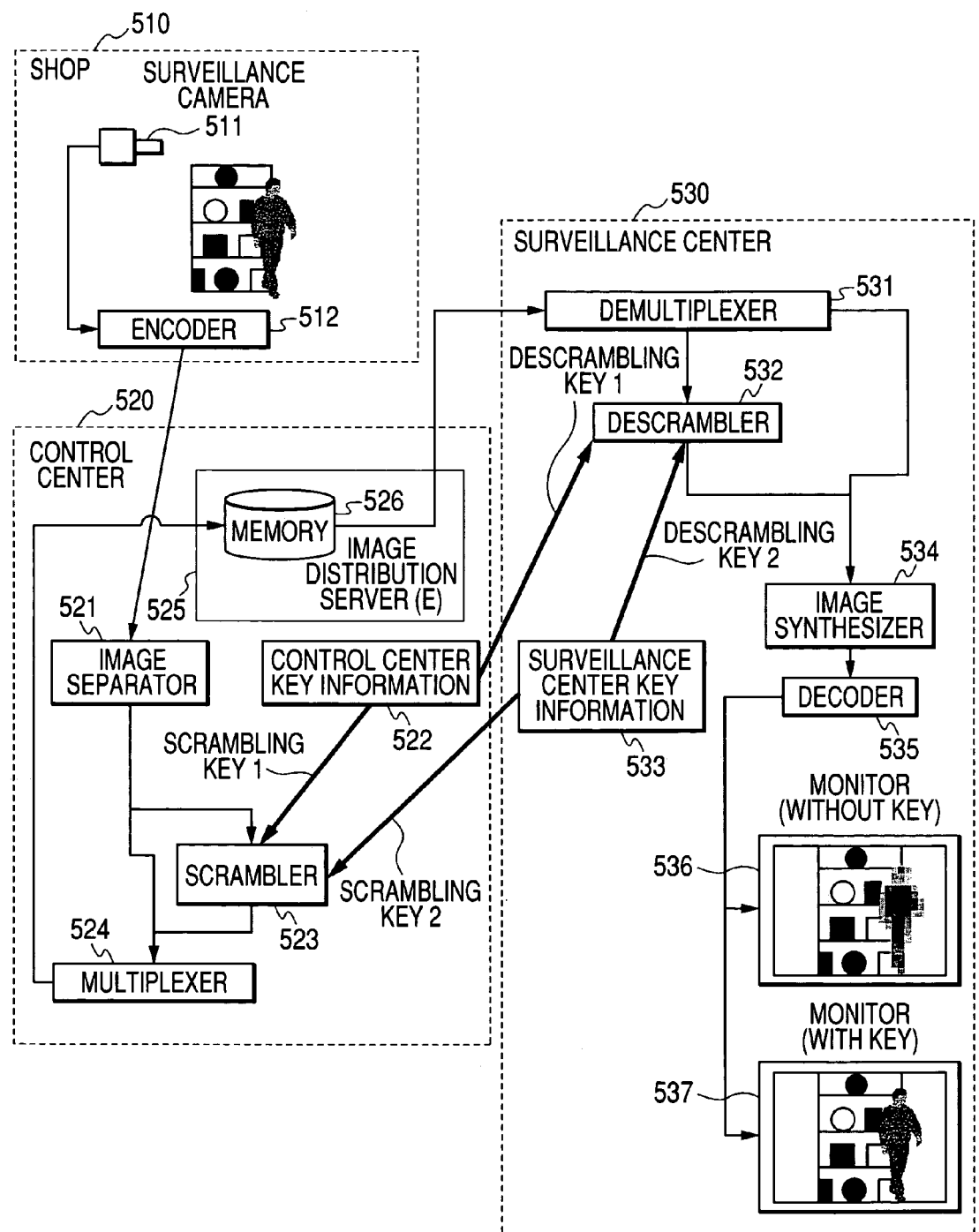
FIG. 9 is a block diagram showing the configuration of a third embodiment of the present invention.

FIG. 9 is a block diagram showing the configuration of the third embodiment of the present invention. Reference numeral 510 denotes a shop where a surveillance camera is installed, 520 denotes a control center for distributing an image inputted with the surveillance camera, and 530 denotes a surveillance center where the image inputted with the surveillance camera is monitored.

In the shop 510, the surveillance camera 511 inputs an image of the interior of the shop showing shelves and customers, the image is encoded into digital data at an encoder 512, and the digital data is transmitted to the control center 520. The encoding performed at the encoder 512 constitutes converting an analog video signal into digital data, such as motion JPEG or MPEG.

In the control center 520, an image separator 521 separates the encoded image into two images for transmission along two routes. This image separation will be described later with reference to FIGS. 10A to 10C. One of the two images is directly inputted to a multiplexer 524. The other of the two images is inputted to the multiplexer 524 after being scrambled (encrypted) at a scrambler 523. For scrambling the image data, scrambling key 1 included in control center key information 522 received from the control center 520 and scrambling key 2 included in surveillance center key information 533 received from the surveillance center 530 are used. Or, scrambling the image data may be enabled using only either one of the scrambling keys 1 and 2. The data synthesized at the multiplexer 524 is inputted to an image distribution server (E) 525 and stored in a memory 526. The scrambling may involve image quality degradation, such as a decrease in resolution, as in the case of mosaicing, bit rate control or spatial frequency processing (due to low-pass filtering).

In the surveillance center 530, a demultiplexer 531 divides the image data synthesized at the control center 520 for transmission along two routes. The image data for transmission along one of the two routes is directly inputted to an image synthesizer 534. The image data for transmission along the other of the two routes is inputted to the image synthesizer 534 after being descrambled (decrypted) at a descrambler 532. For descrambling the image data, descrambling key 1 included in the control center key information 522 as received from the control center 520 and descrambling key 2 included in the surveillance center key information 533 as received from the surveillance center 530 are used. Or, descrambling the image data may be enabled using only either one of the descrambling keys 1 and 2. At the image synthesizer 534, the image data inputted via the two routes are synthesized. The image data thus synthesized is decoded into an analog image signal and then displayed on a monitor. At this time, if a descrambling key which does not match the relevant scrambling key is used or if no descrambling key is used, the image is displayed in a scrambled state, for example, with its moving object area mosaiced, as shown on the monitor 536 in FIG. 9.

If a descrambling key matching the relevant scrambling key is used, the image is displayed in a state as it was inputted in the shop 510, as shown on the monitor 537 in FIG. 9.

Figure 10A:
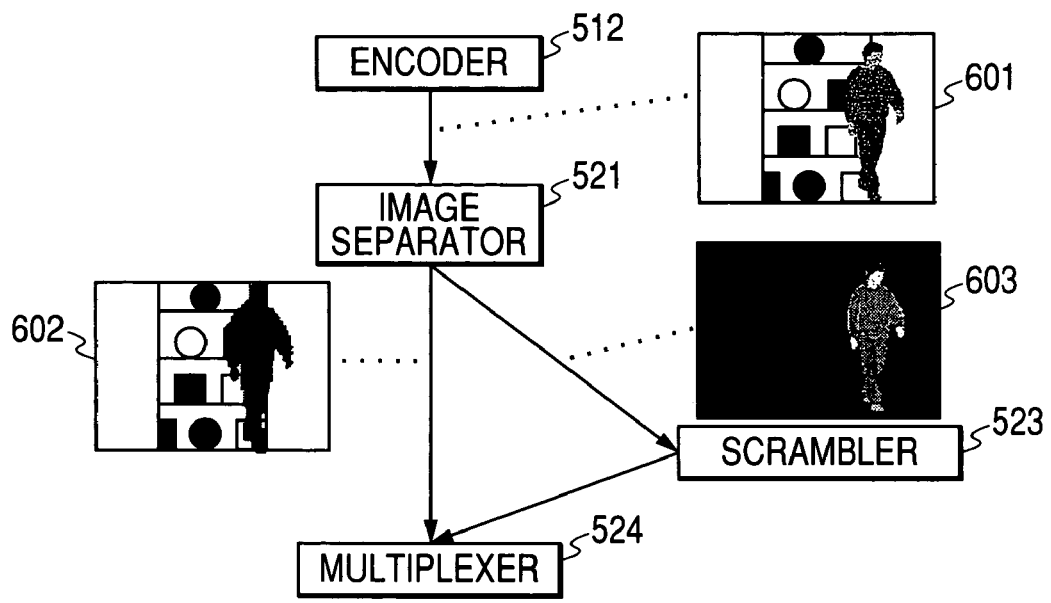
FIGS. 10A to 10C are diagrams showing examples of image separation processing according to the third embodiment of the present invention.
Figure 10B:
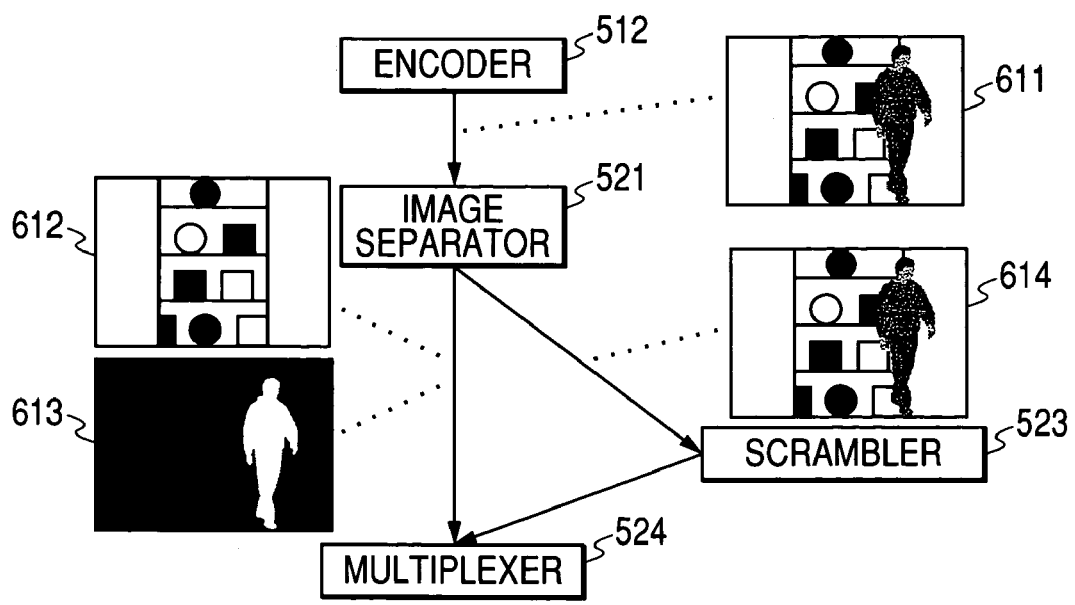

Next, the image separator 521 will be described with reference to FIGS. 10A, 10B and 10C. As described above, the image separator 521 divides encoded image data into two sets for transmission along two routes. FIG. 10A shows an example of image data dividing. Reference numeral 601 denotes an image, inputted with a surveillance camera, before being inputted to the image separator 521. Reference numeral 602 denotes an image from which a moving object area, showing, for example, a customer, has been removed. Reference numeral 603 denotes an image including a moving object area only, for example, showing a customer only. The moving object area of this image is to be subjected to scrambling. FIG. 10B shows another example of image data dividing. Reference numeral 612 denotes an image showing no moving objects, such as a customer, 613 denotes an image for masking a moving object such as a customer, and 614 denotes an image identical with an input image 611. The image 614 is to be subjected to scrambling. In this example, an image inputted to the image separator 521 may be separated into three or more images. To extract an area to be scrambled, for example, an area showing a customer in an image, other methods than the method described for the first embodiment may also be used. For example, as described in "Thermo-Key: Human Region Segmentation from Video Using Thermal Information" on pages 29 to 32 of the program collection (2003) for the Symposium on Real World Information Systems (non-patent document 2), methods in which a distance sensor or a temperature sensor is used or in which a plurality of cameras are used to estimate a three-dimensional depth may be used. It is also appropriate to use a method for extracting the facial portion of a person shown in an image and scramble the extracted facial portion only.

Figure 10C:
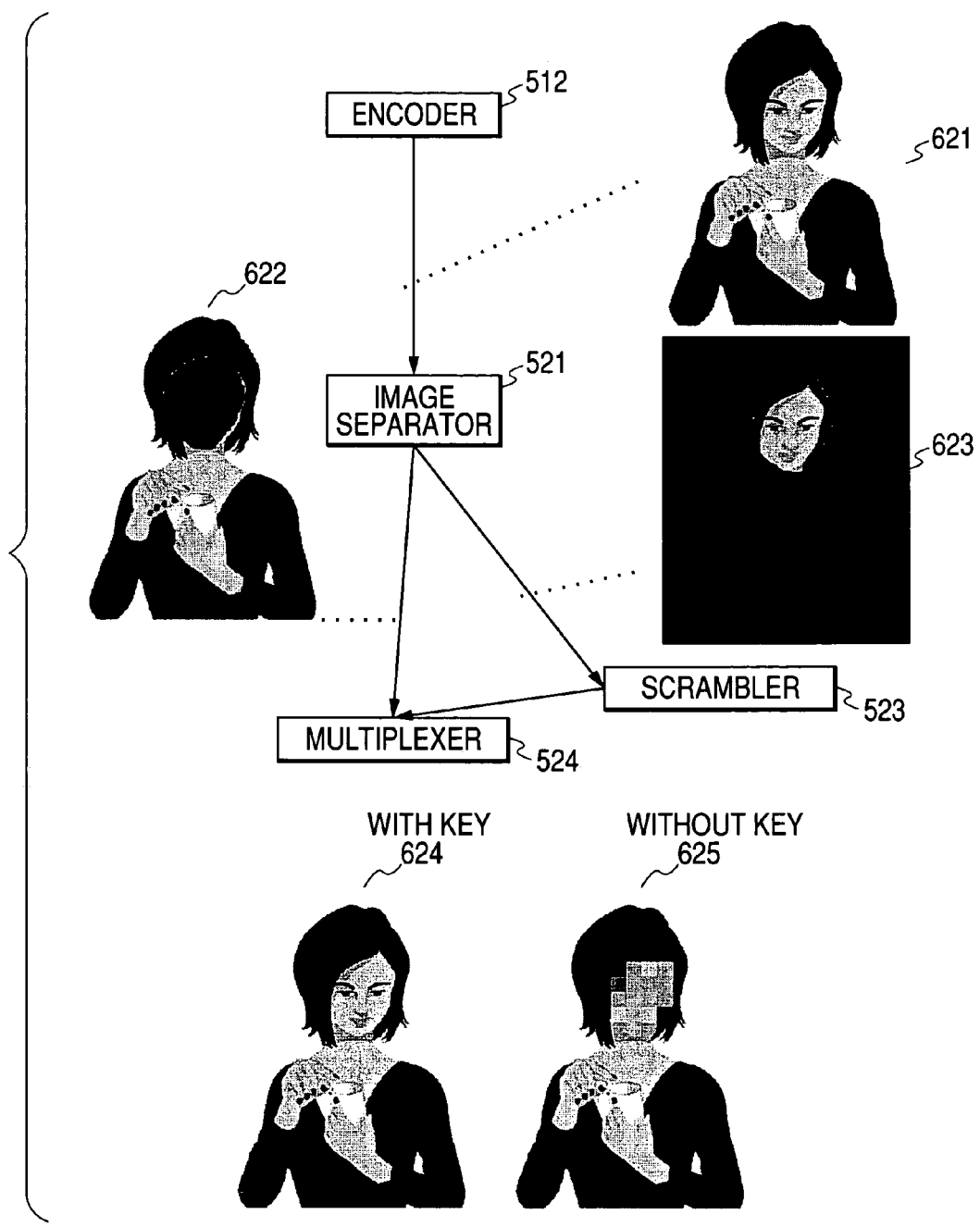

FIG. 10C shows an example in which only the facial portion of a person is scrambled. Reference numeral 621 denotes an image, inputted with a surveillance camera, before being inputted to the image separator 521, 622 denotes an image from which the facial portion of a person has been removed, and 623 denotes an image showing the facial portion only of the person. The image denoted by reference numeral 623 is to be subjected to scrambling. Reference numeral 624 denotes an image outputted after being descrambled by the use of a descrambling key matching the scrambling key that has been used for scrambling the image. Reference numeral 625 denotes an image in a scrambled state. Such an image is outputted when a descrambling key matching the scrambling key that has been used for scrambling the image is not used.

Next, the handling of scrambling and descrambling keys will be explained with reference to FIGS. 11A to 11D.

Figure 11A:
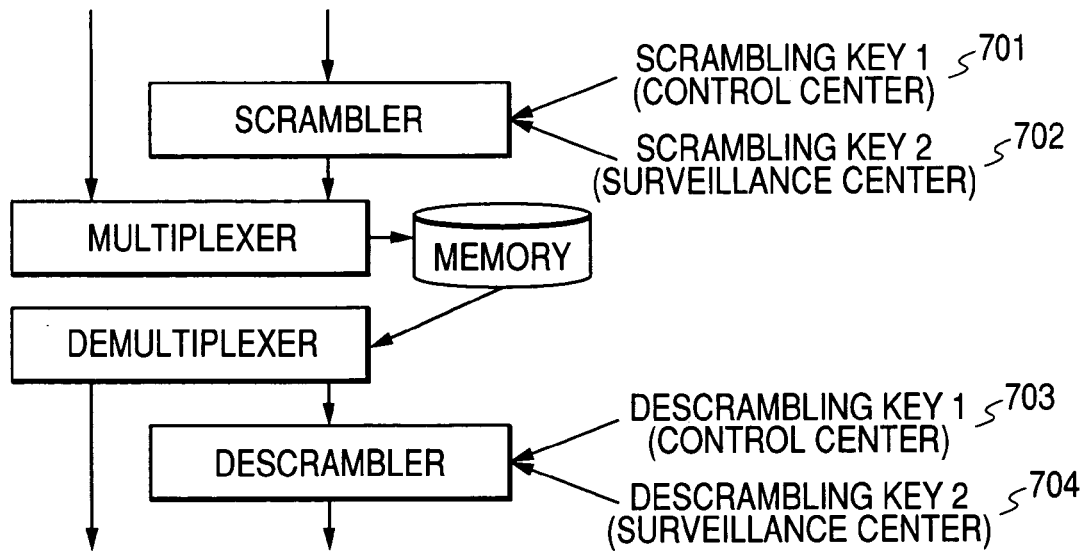
FIGS. 11A to 11D are block diagrams showing the use of scrambling keys and descrambling keys according to the third embodiment of the present invention.

FIG. 11A shows an arrangement in which, as illustrated in FIG. 9, an image is scrambled using two scrambling keys 701 and 702 held by a control center and a surveillance center, respectively, and the scrambled image is descrambled also using two descrambling keys 703 and 704 held by the control center and the surveillance center, respectively. This arrangement realizes a high level of security since it does not allow a scrambled image to be descrambled without using two different descrambling keys. In another arrangement, when the surveillance center asks the control center to descramble an image, the control center may charge a fee to the surveillance center in exchange for issuing the descrambling key 1. Still another arrangement may be provided to limit the time during which the descrambling key 1 can be issued so as to allow descrambling of an image only in an emergency, for example, upon occurrence of a crime at night.

Figure 11B:
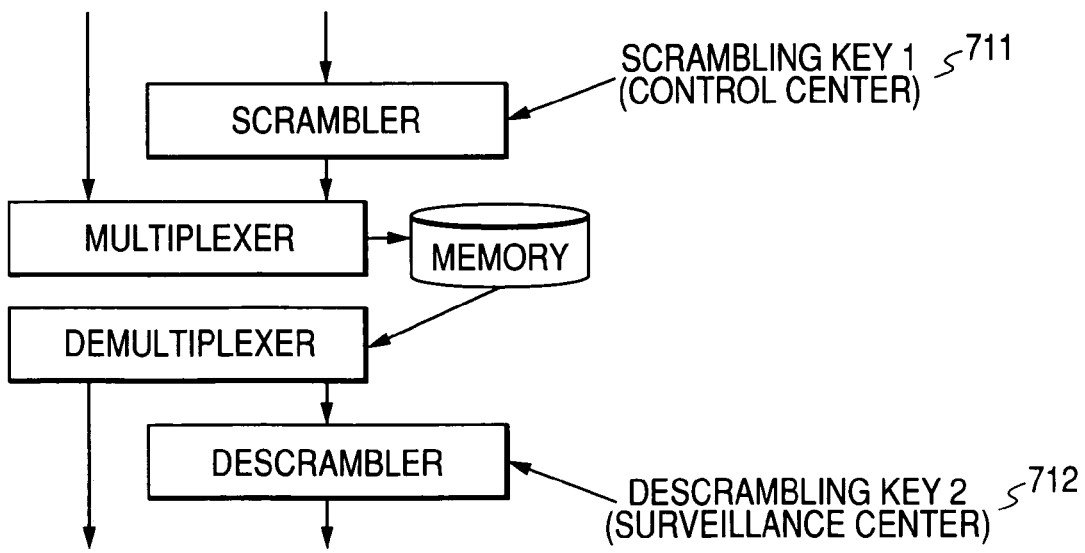

FIG. 11B shows an arrangement in which a scrambling key 711 held by the control center is used for scrambling and a descrambling key 712 held by the surveillance center is used for descrambling. In this case, the control center operates to give the descrambling key to the surveillance center by an offline means. When doing so, the control center may charge a fee to the surveillance center. The control center may set a period of validity for the descrambling key by periodically changing the descrambling key. Such an arrangement makes it possible for the control center to determine the length of the validity period depending on the amount of the fee paid by the surveillance center.

Figure 11C:
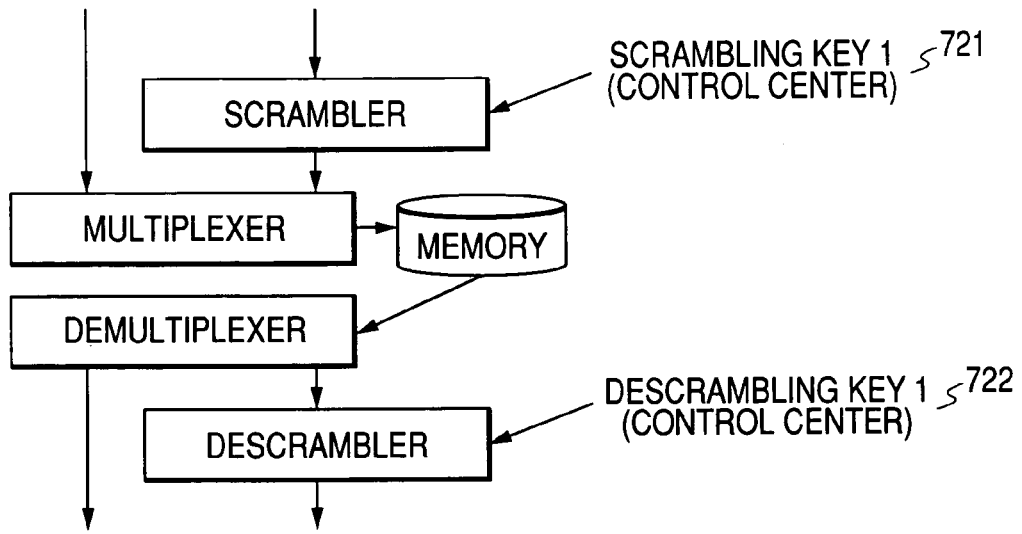

FIG. 11C shows an arrangement in which a scrambling key 721 and a descrambling key 722, both held by a control center, are used for scrambling and descrambling an image. In this arrangement, whenever a user wishes to descramble an image, the user is required to obtain permission from the control center. This arrangement will be suitable, for example, in a case in which the control center and a shop equipped with a surveillance camera are operated by one and the same party or parties closely associated with each other and in which an image inputted with the surveillance camera is distributed to third parties.

Figure 11D:
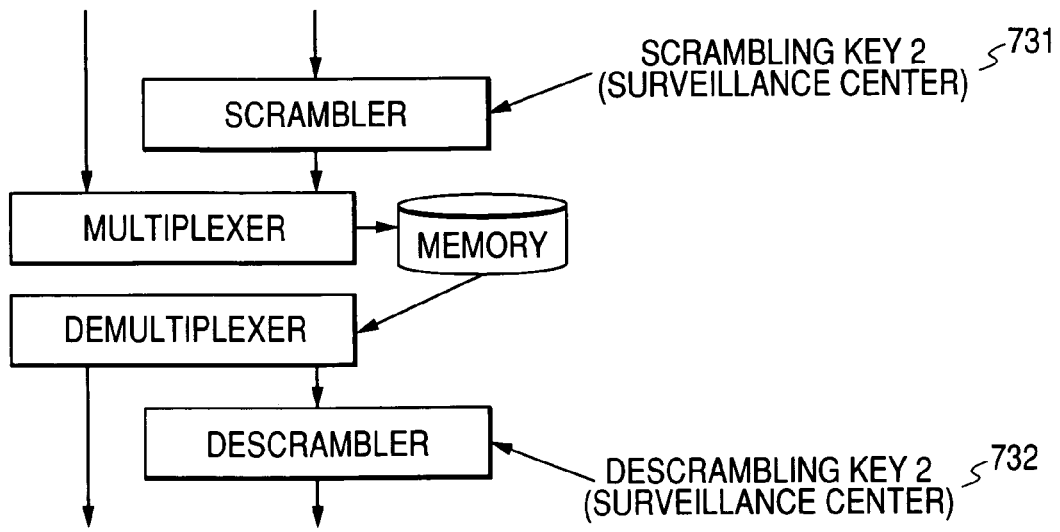

FIG. 11D shows an arrangement in which a scrambling key 731 and a descrambling key 732, both held by a surveillance center, are used for scrambling and descrambling an image. In this arrangement, there is not any control center involved in image scrambling. This arrangement will be suitable, for example, in a case in which the control center and a shop equipped with a surveillance camera are operated by one and the same party or parties closely associated with each other.

With reference to FIGS. 12A to 12D, scrambling and encoding will be described. In the control center in the arrangement shown in FIG. 9 and also shown partly in FIG. 12A, encoding is carried out at the encoder 512, image separation is performed at the image separator 521, scrambling is carried out at the scrambler 523, and synthesis is performed at the multiplexer 524. In the surveillance center in the arrangement shown in FIG. 9 and also shown partly in part FIG. 12B, image separation is carried out at the demultiplexer 531, descrambling is carried out at the descrambler 532, synthesis is done at the image synthesizer 534, and decoding is performed at the decoder 535.

Figure 12A:
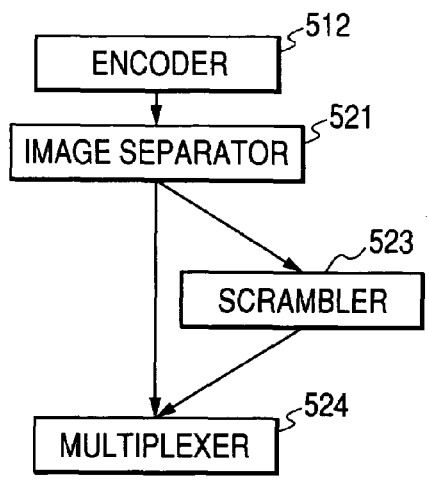
FIGS. 12A to 12D are block diagrams showing scrambling and encoding according to the third embodiment of the present invention.
Figure 12C:
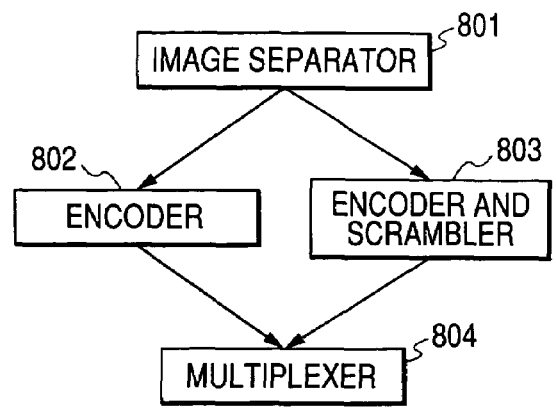
Figure 12B:
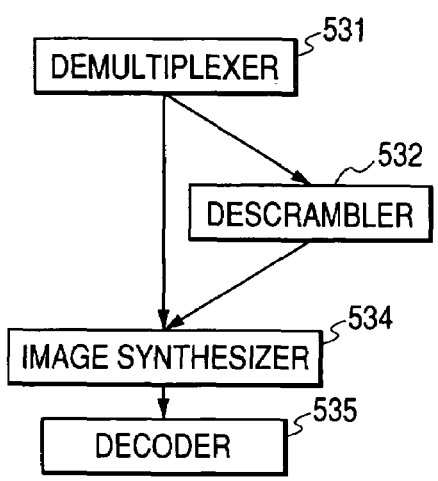
Figure 12D:
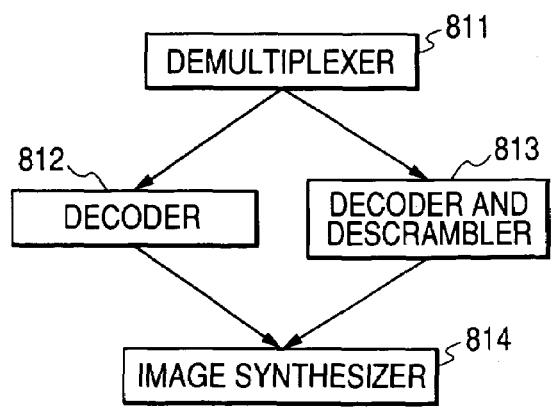

Another arrangement as shown in FIGS. 12C and 12D may also be used. In the arrangement on the image distributor side, as shown in FIG. 12C, an analog image signal is separated at an image separator 801 into two signals for transmission along two routes. One of the two signals is encoded into digital data at an encoder 802. The other of the two signals is encoded and, at the same time, has scramble data embedded in it at an encoder and scrambler 803. These two sets of digital data are synthesized at a multiplexer 804. In the arrangement on the image receiver side, as shown in FIG. 12D, the synthesized digital data is separated at a demuitiplexer 811 into two sets of digital data, one including no scrambled data and the other including scrambled data. The digital data including no scrambled data is decoded at a decoder 812. The digital data including scrambled data is decoded and, at the same, descrambled at a decoder and descrambler 813. The two sets of digital data are then synthesized at an image synthesizer 814.

An image inputted with a surveillance camera installed, for example, in a shop can be distributed to general homes, while protecting the personal rights and privacy of people captured by the surveillance camera.

What is claimed is:

1. An image distribution system comprising an image input device for inputting an image, an image processing section, and a distribution device connected to a network for distributing a processed image, wherein the image processing section separates the image inputted with the image input device into an area to which a moving object image has been inputted and the other area to which no moving object image has been inputted, generates a synthesized image which is equal to the image inputted with the image input device with the area of the moving object image replaced with a corresponding area of an image inputted earlier showing stationary objects only, and outputs the synthesized image to the distribution device.

2. The image distribution system according to claim 1, wherein the image processing section determines an area of the image inputted with the image input device where time-series variation in brightness of each pixel does not remain within a certain range for a certain period of time to be representing a moving object.

3. The image distribution system according to claim 1, wherein the image processing section detects a facial portion of a person in the image inputted with the image input device and determines the detected portion to be representing the moving object.

4. The image distribution system according to claim 1, wherein the image processing section generates the synthesized image based on the area of the moving object image determined using a distance sensor.

5. The image distribution system according to claim 1, wherein the image processing section generates the synthesized image based on the area of the moving object image determined using results of depth measurement made using a plurality of cameras.

6. The image distribution system according to claim 1, wherein the image processing section generates the synthesized image based on the area of the moving object image determined using results of temperature measurement made using a temperature sensor.

7. An image distribution-system comprising an image input device for inputting an image, an image processing section, and a distribution device connected to a network for distributing a processed image, wherein the image processing section separates the image inputted with the image input device into an area to which a moving object image has been inputted and the other area to which no moving object image has been inputted, generates a synthesized image equal to the image inputted with the image input device with the area of the moving object image replaced with a silhouette image of the moving object, and outputs the synthesized image to the distribution device.

8. The image distribution system according to claim 7, wherein the image processing section fills inside an outline of the silhouette image with a low-resolution image.

9. The image distribution system according to claim 7, wherein the image processing section encrypts and then outputs the area of the moving object image to the distribution device.

10. The image distribution system according to claim 9, wherein the encryption comprises, when encoding an analog image signal into a digital signal, embedding encryption data in digital data.

11. The image distribution system according to claim 9, wherein the encryption is effected using a code determined by a distributing party and a receiving party and is designed to be decrypted by the code.

12. The image distribution system according to claim 9, wherein the encryption is effected using a first code determined by the distributing party and is designed to be decrypted by a second code used in communicating the first code to the receiving party.

13. The image distribution system according to claim 9, wherein the encryption is effected using a code determined by the distributing party and is designed to charge a fee to the receiving party, to communicate the code to the receiving party, and to be decrypted by the code.

14. The image distribution system according to claim 9, wherein the encryption is effected using a code determined by the receiving party and is designed to be decrypted by the code.

* * * * *